United States Patent
Rajgopal et al.

(10) Patent No.: US 6,363,515 B1
(45) Date of Patent: Mar. 26, 2002

(54) EARLY POWER ESTIMATION TOOL FOR HIGH PERFORMANCE ELECTRONIC SYSTEM DESIGN

(75) Inventors: Suresh Rajgopal, Bakersfield; Rakesh J. Patel, San Jose; Surujeen Singh, Fremont, all of CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/000,588

(22) Filed: Dec. 30, 1997

(51) Int. Cl.[7] .............................................. G06F 17/50
(52) U.S. Cl. ............................................. 716/5; 716/4
(58) Field of Search ...................... 395/500.02, 500.03, 395/500.05, 500.06, 500.34, 500.39; 716/1, 2, 4, 5; 703/13, 18

(56) References Cited

U.S. PATENT DOCUMENTS

| | | | |
|---|---|---|---|
| 5,535,370 A | * 7/1996 | Raman et al. | 395/500 |
| 5,557,531 A | * 9/1996 | Rostoker et al. | 364/489 |
| 5,625,803 A | * 4/1997 | McNelly et al. | 395/500.35 |
| 5,673,420 A | * 9/1997 | Reyes et al. | 395/500.05 |
| 5,682,320 A | * 10/1997 | Khouja et al. | 364/489 |
| 5,696,694 A | * 12/1997 | Khouja et al. | 395/500.06 |
| 5,831,864 A | * 11/1998 | Raghunathan et al. | 395/500.03 |
| 5,838,579 A | * 11/1998 | Olson et al. | 364/488 |
| 5,838,947 A | * 11/1998 | Sarin | 395/500.35 |
| 5,847,966 A | * 12/1998 | Uchino et al. | 395/500.03 |
| 5,880,968 A | * 3/1999 | Dedhia | 395/500.06 |
| 5,903,476 A | * 5/1999 | Mauskar et al. | 395/500.02 |
| 5,907,698 A | * 5/1999 | Kucukcakar et al. | 395/500.07 |

* cited by examiner

Primary Examiner—Matthew Smith
Assistant Examiner—Leigh Marie Garbowski
(74) Attorney, Agent, or Firm—Trop, Pruner & Hu, P.C.

(57) ABSTRACT

A power estimation tool allows the designer to estimate power usage, at the RTL stage for example, of a high performance electronic system design using available information. This enables power estimation before the circuit schematics are created and early enough for power dissipation to be included in the design optimization. The estimation tool, operable at the RTL level, may provide estimates of power usage of functional blocks and the overall system. The tool can take an HDL description of the proposed design and partition that description into a format which can be analyzed for power usage in an automated fashion. The estimated power use can also be modified to account for different circuit design techniques such domino versus static designs and to account for capacitance and layout considerations. In addition, an empirical estimator for clock and data buffer power usage allows these elements to be accounted for before their design is completed. The tool uses a power model library of prior designs to efficiently estimate power dissipation of subsequent designs.

17 Claims, 6 Drawing Sheets

EARLY POWER ESTIMATION TOOL FOR HIGH PERFORMANCE ELECTRONIC SYSTEM DESIGN

This invention relates generally to a tool for estimating the power dissipation in a proposed electronic system design such as a microprocessor.

BACKGROUND OF THE INVENTION

Designers of complex electronic systems such as microprocessors are faced with a myriad of tradeoffs. Good system design usually involves making the best trade off for the particular circumstances involved. For example, a prime design criteria in microprocessor design is processor speed or performance. This criteria needs to be balanced with considerations relating to die or chip size. Similarly, many systems are designed to enhance the ultimate testability of the design and therefore the ultimate reliability of the parts.

A number of design tools are available to enable the early evaluation of performance of circuit designs. These tools enable the designer to estimate performance, to identify components which are contributing to a performance reduction and to redesign those components during the design process.

Limiting power consumption in high performance microprocessors ensures cost effective desk top computers and faster portable computers. The rapidly growing portable computer market requires power efficient central processing units that permit higher performance while achieving an acceptable battery life. Personal computers could become more expensive as a result of increased cooling and power delivery costs necessary for improved processor performance, if power dissipation is not controlled. Ideally, processor performance could be improved without correspondingly increased power delivery and cooling costs.

In high performance microprocessors, no one design element is responsible for power consumption. Moreover, any attempt to analyze power consumption in such high performance systems is made more complex because the design methodology varies for different design blocks.

Many of the attributes of high performance designs, such as power dissipation, have complex interactions with other design attributes such as performance. As the design develops, it becomes progressively more difficult to change the design features to re-balance those attributes. As the design becomes more mature, changes can have a substantial impact on cost and schedule. Unfortunately, early in the design stage the circuit design may still be at a high level of abstraction. As the design matures the circuit may progress through refinements from a high level functional description to a structural description to a logic level and ultimately to a detailed gate level. Optimizing attributes early is advantageous for the reasons described above; however, it would appear to be difficult to assess power use accurately early in the design process when the circuit in question is only abstractly described.

As a result, there is a need for a tool that predicts the power dissipation of electronic systems early enough in the design process. Assessing the power saving features early in the design enables power saving features to be included in the design before the design is too mature to readily allow such modifications to be made without excessive costs.

Because of the complexity of electronic systems, such as microprocessors, any estimating tool must handle large, complex and often customized data path blocks, synthesized and nonsynthesized logic, mixed logic styles, such as domino and static styles, and clock and data buffer models. There is a need for such a power estimation tool which accounts for these variations in a way that makes it easy for the designer to determine the power usage of the system and to balance the power dissipation against other design criteria such as performance, size, testability and the like.

SUMMARY OF THE INVENTION

An early power estimation may be developed before the circuit design is well defined with sufficient accuracy to allow designers to optimize the power dissipation of a high performance system while other attributes such as area, floor plan or performance are still being evaluated.

In accordance with one aspect of the present invention, a method of estimating power use by a proposed electronic system design before the design is completed includes the step of developing a power model for various components of the design at the functional block level. The power use by the design is then estimated.

In accordance with another aspect of the present invention, a method of estimating power use by a proposed electronic system design before the design is completed includes the step of developing a hardware description language ("HDL") description of the proposed design. The HDL description is then used to develop a measure of the power use by the proposed design.

In accordance with yet another aspect of the present invention, a method of estimating power dissipation includes the step of estimating the power use of an electronic system. The estimated power use is tuned to account for specific design elements of the system.

In accordance with another aspect of the present invention, a method of estimating power use of the proposed electronic system design before the design is finalized includes the step of estimating the power use of the overall system excluding data and clock buffers. The power use of the data and the clock buffers is empirically estimated and a measure of the number of data and clock buffers in the system is developed. This data and clock buffer measure is added to the estimated system power use of the overall system.

DETAILED DESCRIPTION

Figure 1:
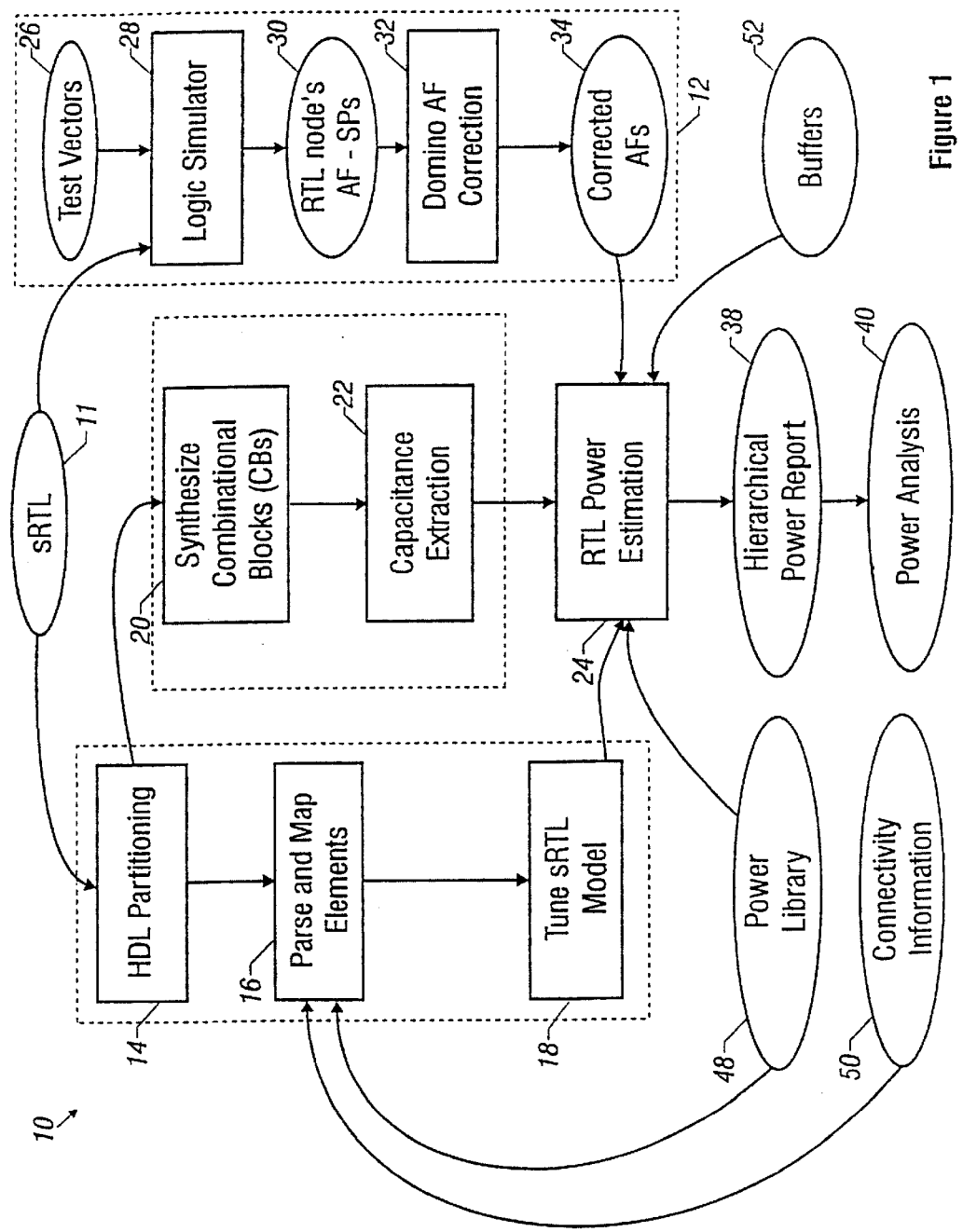
FIG. 1 is a flow chart showing the flow of one embodiment of a power estimation tool.

A tool 10 for estimating the power use of a proposed electronic system design before the design is completed, shown in FIG. 1, implements a "bottom up" power estimation flow for various blocks such as data path, memory, and synthesizable and sequential logic. The estimation process begins by identifying blocks within the system represented by a Hardware Description Language ("HDL"). While a fully automated system is described herein, those skilled in the art will appreciate that some of the portions of the tool and the estimation flow could be implemented in a non-automated fashion as well.

The tool 10 enables the design engineer to predict power consumption at the register transfer level ("RTL") of abstraction. The description that follows refers to a structural or sRTL as opposed to a behavioral RTL.

Referring to FIG. 1, there are three basic flow paths, including the generation of values indicative of power use shown at block 12, the development of a mapped power estimation for partitioned HDL code represented by block 14 together with the tuning of that estimate in block 16, and the development of a power estimation for synthesizable combination blocks ("CBs") depicted in block 20.

The tool operates differently on synthesizable and non-synthesizable blocks since the synthesizable blocks may be quickly represented in an automated fashion by a detailed circuit implementation, comparable to a circuit schematic, while the nonsynthesizable block cannot be so represented. Thus, the synthesizable elements can be synthesized and subjected to an HDL analysis to determine a measure of their power use.

A conventional RTL simulator 28 is capable of developing two measures which are important indicators of power usage called activity factor ("AF") and signal probability ("SP"). AF is a toggle count normalized over a number of clock cycles and SP is the probability of a node being high over the total simulation clock cycles. The AF and SP values of the RTL nodes are used to evaluate power models. The generation of AF and SP values at nodes or interfaces between functional blocks may be sufficient in most cases.

In particular, the test vectors 26 and the sRTL description 11 are utilized in the RTL simulator 28 to come up with AF and SP values under different conditions. For example, a set of test vectors may be utilized including an idle test vector, an active test vector and a high power test vector. The idle test vector looks at the system in an idle state while the active test and high power test evaluate the system when it is operating and when it is at its highest power usage state, respectively. In this way, a low, medium and high measure of power usage may be developed. For example, the average case vector may be critical to assessing impact on battery life and the high vector is used to assess cooling and power delivery design issues. The idle vector may identify sources of wasted power.

The output of the RTL simulation is a switching activity file on a functional block level with the AF and SP values for all of the nodes visible at the RTL level, as indicated at block 30. The switching activity file gives the AF and SP values for each signal name.

The switching activity file is then corrected to account for differences in circuit design. For example, the AF and SP values do not account for special circuit designs such as the domino as opposed to the static circuit design. At block 32 a correction accounts for the increased power usage of the high performance domino circuit designs. This results in a corrected AF at block 34 and the AF and the SP values are then transferred to the RTL power estimator 24.

Usually domino style circuits use multiple stages. Each stage of the circuit evaluates its inputs and passes its results to the next stage only when a clock or controlling signal of that stage is valid. The output of each stage is precharged high before it evaluates its inputs. Each stage precharges its output to a known value on the first half of each clock cycle. In the second half of each clock cycle, the output value is changed depending on its input.

Figure 2:
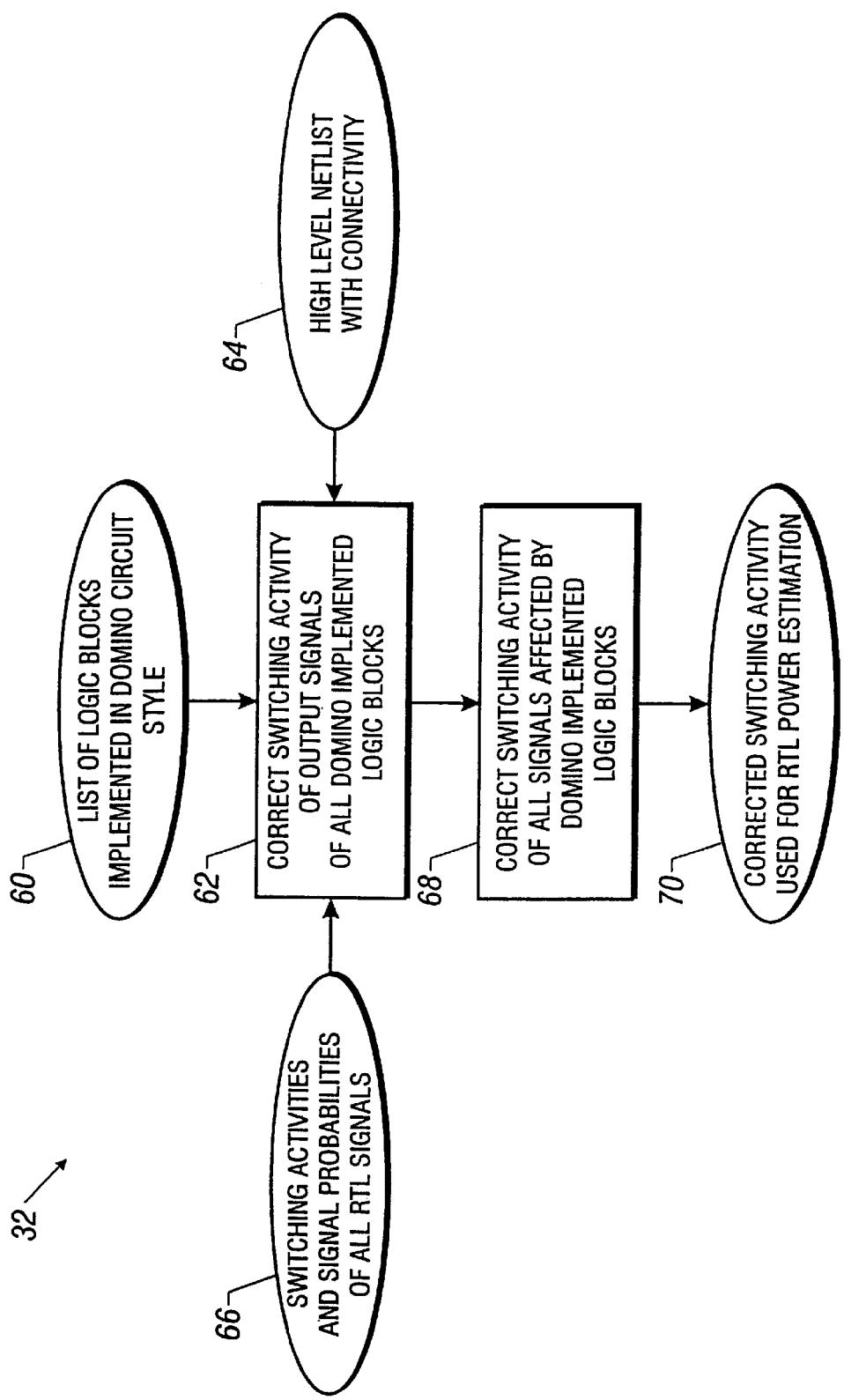
FIG. 2 is a flow chart showing a switching activity correction.

Referring to FIG. 2, the correction of the switching activity file, illustrated by block 32, begins by making a list of logic blocks (block 60) implemented in a special circuit style, such as the domino circuit style. This information is used to correct the switching activity output signals of all domino logic blocks (block 62). A high level netlist, with connectivity information (block 64), switching activity factors (AFs) and signal probabilities (SPs) for all RTL signals (block 66), is used.

The probability of any signal being high (logic 1) during the simulation is the signal probability. For example, the SP of a signal, "sig_a" is determined by the number of clock cycles "sig_a" is high divided by the total number of clock cycles for the simulation.

The AF value is corrected for all signals affected by domino implemented logic blocks (block 68). The input activity factor of blocks downstream from a domino block is changed as a result of the upstream domino blocks. The logic simulator does not correct these downstream blocks for the effect of the upstream use of domino blocks. Therefore, the AF values of the downstream blocks may be corrected at block 68 to account for the effect of the upstream domino blocks. A corrected switching activity file results (block 70).

Referring again to FIG. 1, using the sRTL description 11, the HDL code for the circuit design is partitioned in block 14 into four groups—data paths, sequential logic, control and any other functional blocks not parseable into one of the three other groups. The HDL partitioning is accomplished using existing HDL capabilities known to those skilled in the art. The block netlists for each group are then fed to the automated mapping software 16 which develops a power mapped netlist.

The software 16 receives information from an RTL power model library 48. The RTL power model library is a collection of analytical power models for a variety of data path and memory blocks. It covers a broad range of logic and circuit styles commonly used in complex systems. For example, logic blocks may include programmable logic arrays ("PLAs"), adders, comparators, multiplexers, shifters, decoders, encoders and the like. Each logic block can be implemented using many different logic techniques. For example, an adder may be implemented as a carry-save-adder or a carry-look-ahead-adder. Similarly, each logic type can be implemented using different styles—a carry-save-adder can be implemented as a static, domino or dual rail domino type. Thus, the power library includes a number of models for commonly used functional blocks.

The power models may be derived from actual schematics from previous generation systems. Functional blocks in the prior designs are analyzed and modified for incorporation in the power model library. These models are generalized to use with different input widths. Thus, if a prior generation schematic for a given block has been designed for certain size, a certain number of inputs or a certain number of outputs, the derived model is generalized to be upgradable to account for different inputs, different outputs or different sizes. For an example, an adder in a prior generation schematic could have been adding 4 bits at a time but the next generation model may need to work for 4 bits, 8 bits, 32 bits or 64 bits. So the bit width is made a variable in the resulting power library model so that the power can be estimated while accounting for additional bit widths. This allows the model to be applied to a larger space.

In addition, in developing the power model library, some complex logic blocks must be broken down into smaller blocks. Often the prior schematics may represent complex data path functions that manipulate data. These data path functions can be simplified into simpler data operations which would have more general application. Special case elements which are not likely to be repeated can be removed and elements that are commonly repeated may be taken in total.

Figure 3:
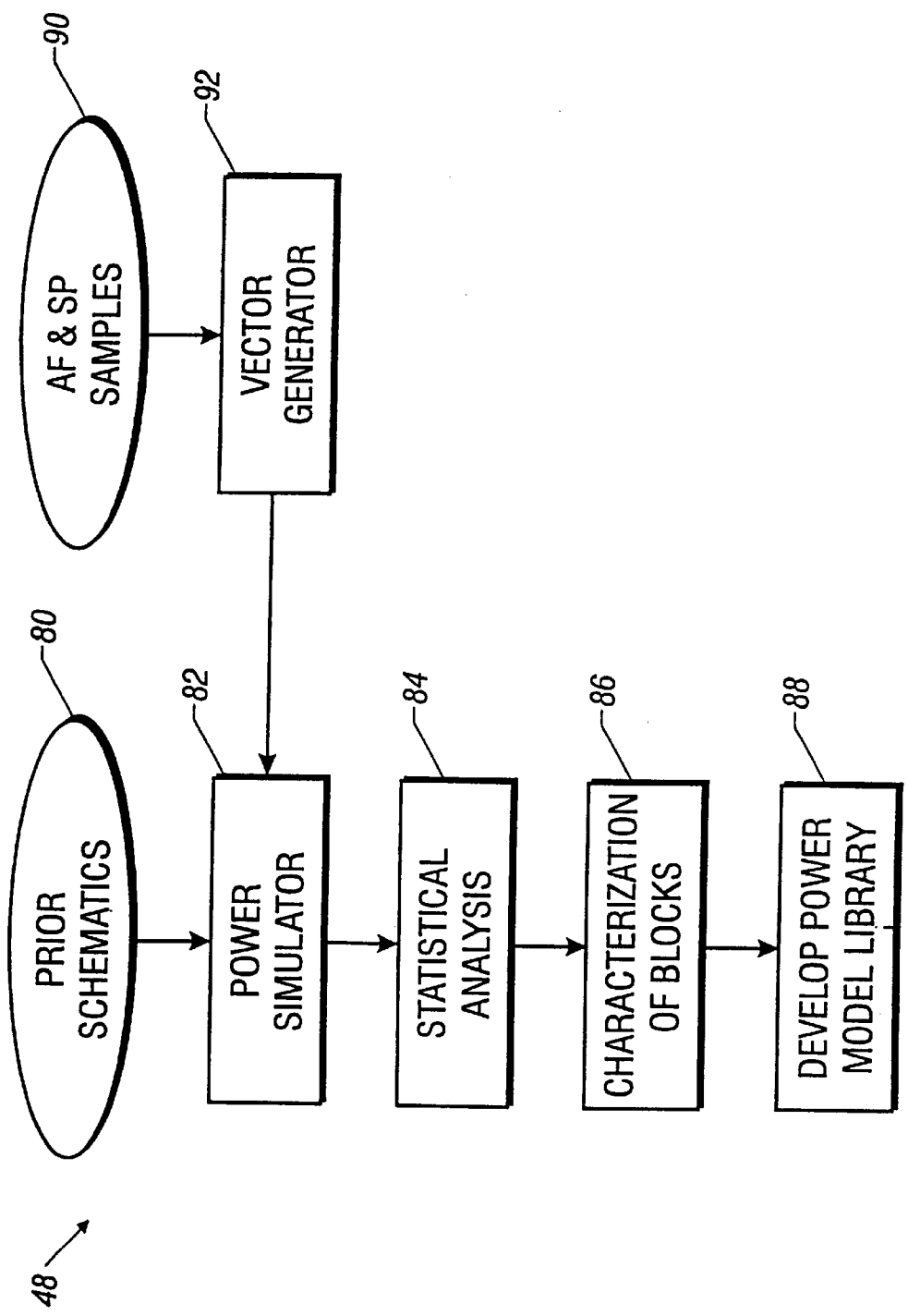
FIG. 3 is a flow chart showing how the power model library is developed.

Referring to FIG. 3, to develop the power model library 48, each of the previous generation circuit schematics (block 80) is then run through a power simulator (block 82). The simulator may be a circuit level power simulator such as PowerMill by EPIC Design Technology of Sunnyvale Calif. The simulator gives power numbers for the prior generation circuit blocks. A range of generated AF and SP samples (block 90) (e.g., 0.2, 0.4, 0.6, 0.8) are run through a pseudo random vector generator (block 92) that develops vectors for the power simulator. The vector generator may use a mathematical algorithm, such as the Marcov chain algorithm, to develop vectors from the AF and SP samples.

A statistical analysis (block 84) is done to develop a generalized equation or other characterization of power use for the various blocks (block 86). If a curve fitting analysis is possible an equation may be developed. The equation includes constants for given blocks and variables in terms of AF and SP values. Other variables could include the size of the block in bits, the number of inputs, the number of outputs, and capacitance values at block interfaces. Alternatively, a table look up can be generated. In either case the statistical analysis provides a mechanism to generate power values once AF and SP values for the circuit under design can be evaluated. After a number of functional blocks have been analyzed in this way, a power model library is developed (block 88).

Referring to FIG. 1, the block 12 generates AF and SP values for this particular design. Those actual variables may then be plugged into the corresponding variables in the power model equation to generate power values.

The power estimation process (block 24) involves taking the AF and SP values from block 34 and combining them with the power models from the power model library 48. The AF and SP values from block 34 are mapped into the power model library characterization for the partitioned blocks and the appropriate corrections and scaling for the new design are undertaken to get power values. Initially the power model library 48 is mapped to the partitioned HDL at block 16 to determine if power models are available for the partitioned blocks. After tuning at block 18 the combining of power model characterizations and the AF and SP values from block 34 may occur.

Referring to FIG. 1, functional block connectivity information 50 is utilized by the mapping software 16 to account for the way that the various blocks are connected together and the effect that connectivity has on power usage. Generally, the connectivity information can be derived from the block netlist information.

Figure 4:
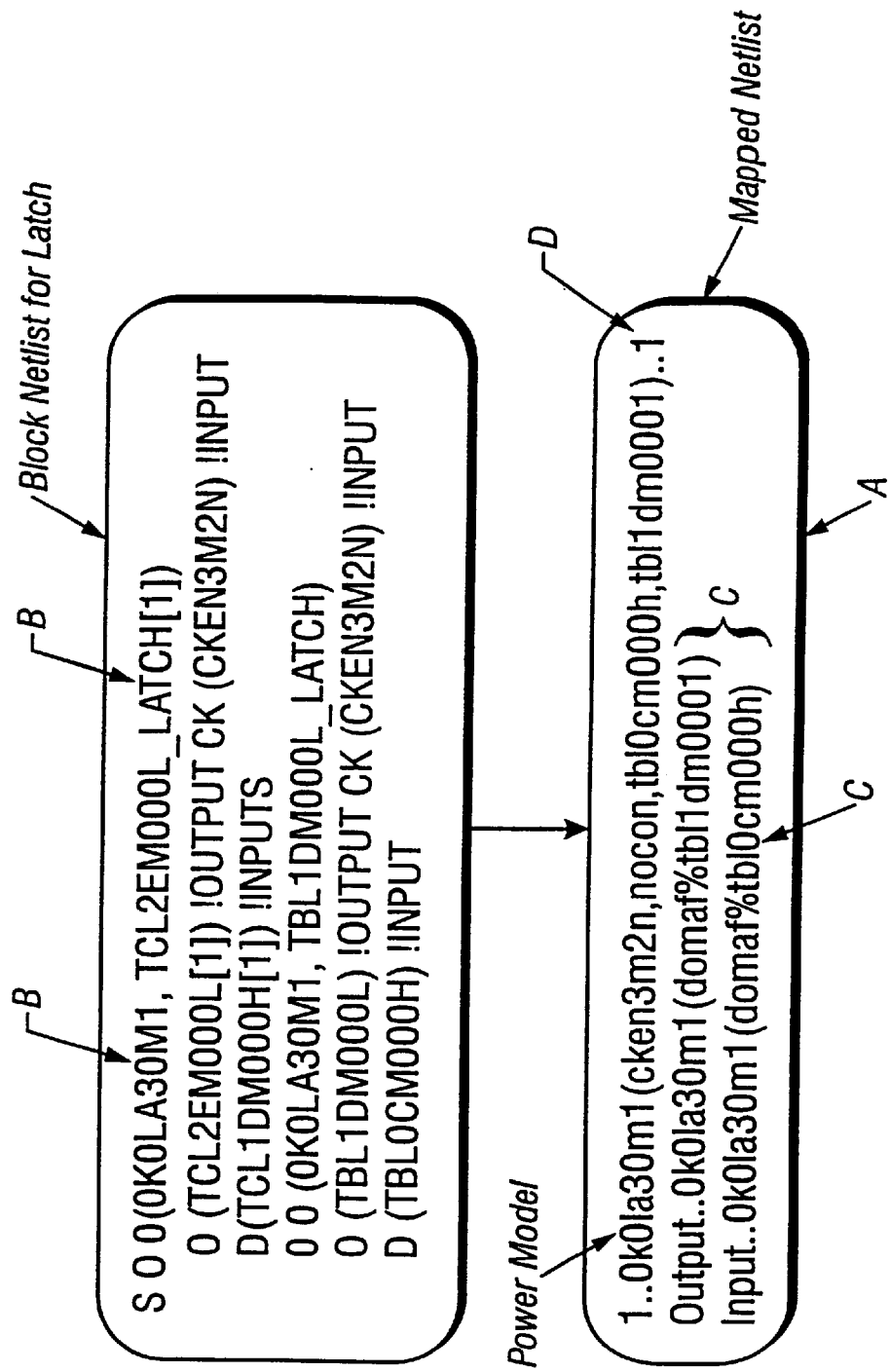
FIG. 4 shows the automated mapping for a latch.
Figure 5:
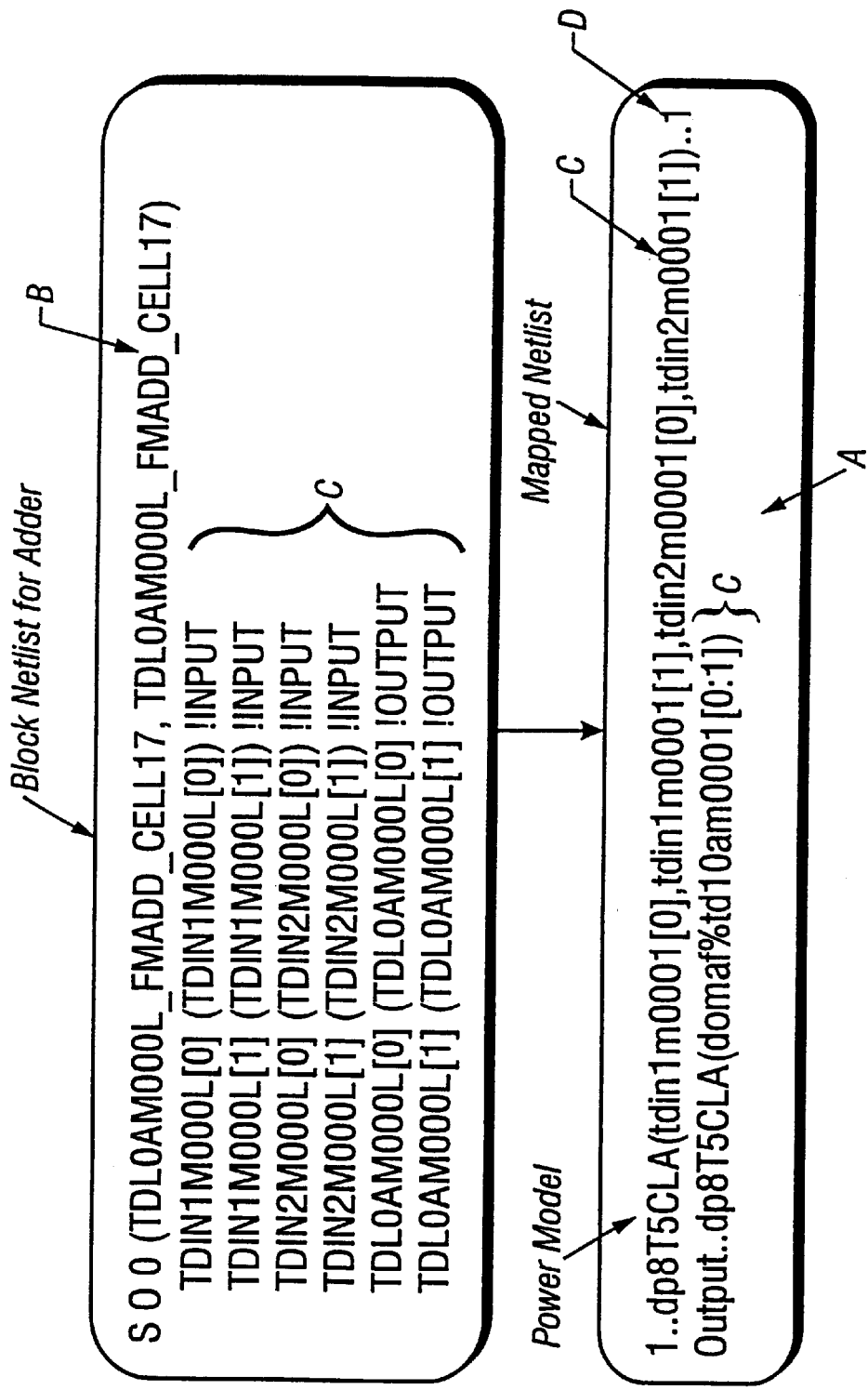
FIG. 5 shows the automated mapping for an adder.

The automated mapping software 16 does automated mapping of the power library models with the RTL blocks. The partitioned HDL gives block level connectivity information, what kind of data path blocks are used, and what kind of operators are used. Based on that information, the best library models (in terms of AF and SP values) are chosen and mapped to the corresponding blocks. For example, the connectivity information tells how wide a given block is and this can be used to select the correct model. The resulting mapped netlist then has power model information attached to the listing for each block. Examples of the operation of automated mapping software for a latch (FIG. 4) and an adder (FIG. 5) show how the mapped power model information "A", operator information "B", connectivity information "C", and information "D" about the kind of circuit implementation used for data path blocks, may be developed from the netlist.

The resulting RTL model is tuned, in block 18, to reflect schematic level detail not represented by the mapped RTL model. The RTL model often does not have information about logic and circuit implementation details or changes necessary for performance and area requirements. The power estimation without this information is not fully accurate and therefore it is desirable to reflect this information into interface files to get a more accurate power estimate. Thus, the software 16 generates a mapped RTL netlist with a default circuit style. These defaults can be overwritten by special tuning commands. In effect, the user can tune the sRTL models or override default power estimates using those special commands. For example, a circuit style could be changed from domino to static style, by changing the code "D" in FIGS. 4 and 5.

Synthesizable RTL, meaning RTL which can be synthesized into a circuit schematic type level of detail, can usually be synthesized in a number of different configurations. Thus, the synthesizable logic is simply synthesized (block 20) to automatically generate a netlist as indicated in FIG. 1. In effect, a "quick synthesis" flow is used to enable fast estimation by logic synthesis. Actual test vectors are then used to estimate power. Again, the test vectors are used to extract the AF and the SP values at the functional block interfaces.

The RTL gives the inputs to the mapped netlist in the form of the input AF and SP values for the schematic once it has been quick synthesized. A probabilistic estimation method propagates the AF and SP values into the synthesized blocks and gives a power use estimate. Probabilistic propagation techniques are known to those skilled in the art.

The quick synthesis technique is not concerned about the performance of the synthesized schematic, since the implementation can be modified, if necessary. The idea is to get the gate level schematic quickly. This is done using a "single pass" synthesis without subsequent tuning or iteration. This can be used to estimate the power. While the techniques described previously use a "bottom up" technique, for example, for generating the power model library and the other models, in the case of the synthesizable RTL, a "top down" refinement technique may be utilized.

In block 22 of FIG. 1, a capacitance extraction is performed for the synthesizable blocks to account for capacitance effects on power dissipation. This capacitance could arise, for example, from the specific way that metallization is accomplished in a particular process and is not accounted for in the synthesized netlist. The capacitance extraction together with the AF and SP values from the synthesized netlist enable accurate power estimates for the quick synthesized blocks.

Finally, estimated clock and data buffer power measures are developed (block 52). This may be done by looking at schematics for prior generation designs to see how many clock and data buffers were used. Empirical information is derived about how many times buffers were used under given conditions, how big the buffers are and how much power they dissipate. This empirical information can be used to develop algorithms for estimating that you will have a certain number of clock buffers and a certain number of data buffers based on past experience. While the actual empirical rules may vary from design to design, the same methodology can be utilized from case to case.

Figure 6:
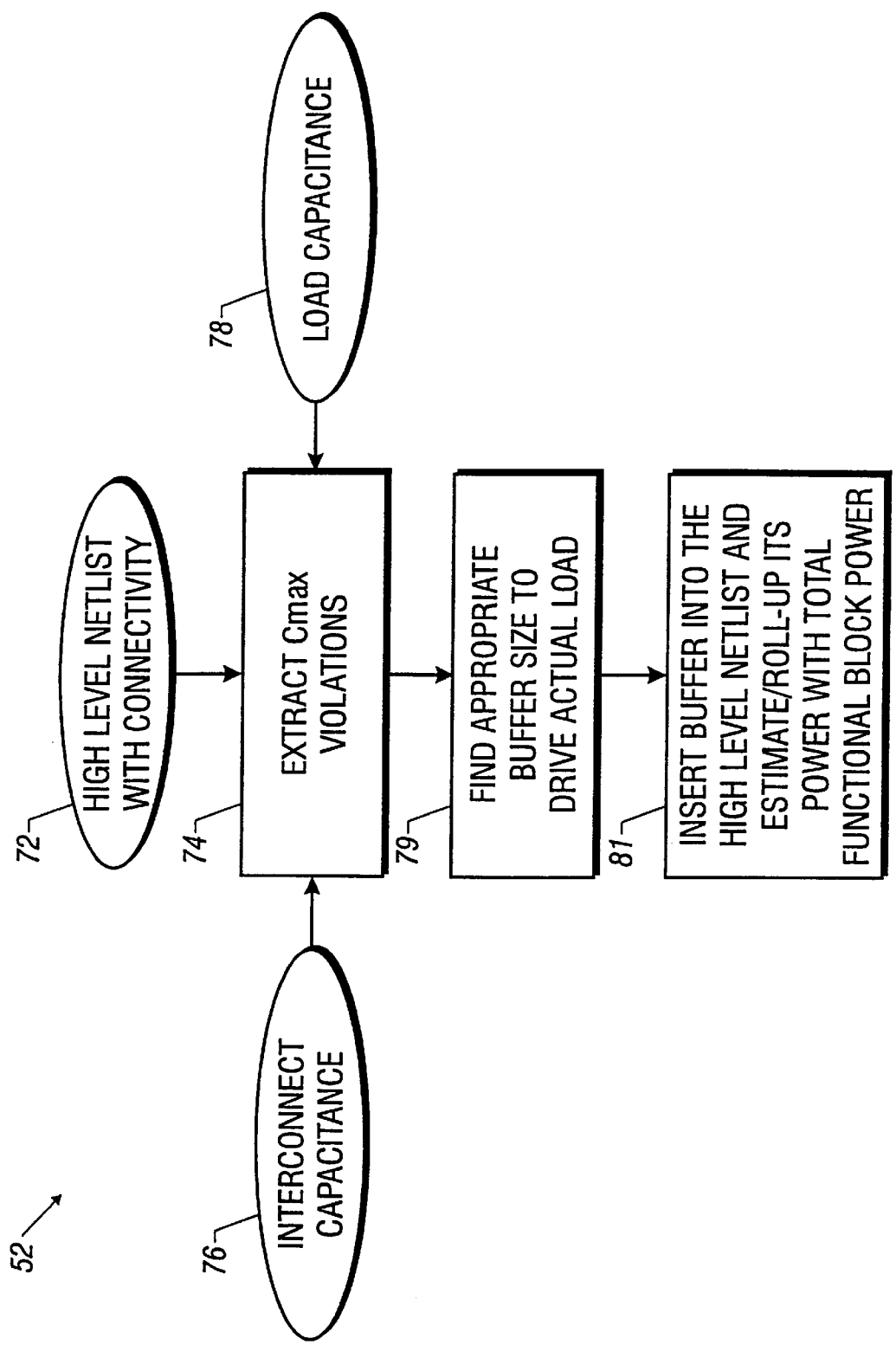
FIG. 6 is a flow chart showing the buffer insertion methodology.

The effect of the buffers may also be estimated, as shown in FIG. 6, using a high level netlist with connectivity information (block 72). Maximum capacitance (Cmax) violations are extracted (block 74) using interconnect (block 76) and load (block 78) capacitances.

Cmax is the maximum allowable capacitive load. A Cmax violation occurs when the capacitive load exceeds the maximum allowed capacitance load. The capacitance load is the sum of the load and interconnect capacitances. The interconnect capacitance is the sum of the wire and cross capacitance.

An appropriate buffer size is determined to drive the actual load (block 79). The larger the buffer size, the more capacitive load it can drive. The buffer is inserted into the high level netlist and its power use is rolled up with the power use of the functional blocks (block 81).

Finally, the power estimation tool 24 takes all of this information and develops an initial power estimation. The power estimates for each of the logic blocks are rolled up, and an indication of the difference between individual logic types for some logic blocks can be provided, if desired. Different logic types would account for different ways of implementing different functional blocks. For example, an adder may be a carry-save-adder or a carry look ahead adder. This allows the designer to try different combinations to determine what effect different design alternatives might have, for example, on power usage versus performance.

The tool 24 examines the mapped sRTL model and picks up logic blocks and implementation details and uses the corresponding power models from the power library. The power models are evaluated using AF and SP values and capacitances of input, output and control signals based on full chip connectivity information. This process is repeated for each logic block implemented in the sRTL model. After estimating power for the individual logic types, the tool 24 rolls up power estimates for all the logic blocks and generates a hierarchial power report 38 for each functional block. The tool then follows a similar "bottom up" approach to develop hierarchical reports for unit and full chip power estimates.

In a power analysis stage 40, power estimates may be analyzed using the hierarchical power report discussed above. The tool breaks down the power dissipation for the different logic types as well as the individual logic blocks. This helps to identify those areas which are utilizing the most power and could achieve the most potential power savings. Once the higher power using blocks are identified, the tool may speed up the power optimization cycle by helping to determine the cause of power consumption and by validating a power reduction technique. By doing this analysis at the RTL level, a power estimate can be developed sufficiently early in the design process to enable power dissipation to be factored into the design optimization process without adverse cost or schedule effects.

While the present invention has been described with respect to a limited number of embodiments, those skilled in the art will appreciate numerous modifications and variations therefrom. It is intended that the appended claims cover all such modifications and variations as fall within the true spirit and scope of the present invention.

What is claimed is:

1. A method of estimating power use by a proposed electronic system design before the design is completed comprising:

developing a hardware description language description of the proposed design;

partitioning said description into data path blocks, sequential blocks, control logic blocks and other blocks; and using the partitioned descriptions to develop a measure of the power use by the proposed design.

2. The method of claim 1 including obtaining a previous hardware circuit design, generating a power model library using the said previous hardware circuit design, and adapting the library to the proposed design.

3. The method of claim 2 wherein said proposed design includes a plurality of functional blocks, said method further including incorporating connectivity information into a mapped netlist representative of each functional block.

4. The method of claim 1 including synthesizing netlists.

5. The method of claim 4 including using single pass synthesis.

6. The method of claim 4 including extracting capacitance information and applying that information to said netlist.

7. A method comprising:

estimating the power use of an electronic system;

identifying domino type circuit elements in said electronic system;

correcting the power use estimate to account for the use of domino type circuit elements; and tuning the estimated power use to account for specific system design.

8. The method of claim 7 including developing activity factor and signal probability information and correcting that information for domino type circuit elements.

9. The method of claim 7 including making an actual circuit implementation of said electronic system, said implementation including details and correcting the power use estimate based on actual circuit implementation details.

10. The method of claim 7 wherein said power use is estimated at the RTL level.

11. The method of claim 7 including providing an indication of both the estimated power use and the tuned estimated power use.

12. The method of claim 7 including indicating the power use of the system that includes components and the power use of said components.

13. A method of estimating the power use of a proposed electronic system design before the design is finalized comprising:

estimating the power use of the system design excluding buffers;

empirically estimating the power use of the buffers;

developing a measure of the number of buffers in the system design; and adding an estimate for buffer power use to said estimate of the power use of said system design excluding buffers.

14. The method of claim 13 wherein said estimate for buffer power use is automatically applied to said estimated power use.

15. The method of claim 13 including estimating power use for data and clock buffers.

16. The method of claim 15 including estimating the capacitive load which must be driven by a buffer.

17. The method of claim 16 including determining an appropriate buffer size necessary to drive an estimated capacitance load.

* * * * *

UNITED STATES PATENT AND TRADEMARK OFFICE
CERTIFICATE OF CORRECTION

PATENT NO. : 6,363,515 B1
DATED : March 26, 2002
INVENTOR(S) : Suresh Rajgopal, Rakesh J. Patel and Surujeen Singh It is certified that error appears in the above-identified patent and that said Letters Patent is hereby corrected as shown below:

<u>Column 8,</u>
Line 20, after "system" insert -- to form a first estimate --;
Line 23, delete "power use" and insert -- first --;
Line 24, after "elements" insert -- and to form a second estimate --;
Line 25, delete "estimated power use" and insert -- second estimate --;
Line 33, delete "power use" and insert -- second --;
Lines 35-36, delete "said power use is estimated" and insert -- estimating the power use of an electronic system to form a first estimate includes estimating the power use --;
Line 38, delete "estimated power use" and insert -- second estimate --;
Line 39, delete "estimated power use" and insert -- second estimate --;
Line 56, after "power use" and before the "." insert -- of the system design excluding buffers --.

Signed and Sealed this

Eighth Day of October, 2002

*Attest:*

*Attesting Officer*

JAMES E. ROGAN
*Director of the United States Patent and Trademark Office*